US009488740B2

(12) United States Patent
McGowan et al.

(10) Patent No.: US 9,488,740 B2
(45) Date of Patent: Nov. 8, 2016

(54) APPARATUS, METHOD, COMPUTER-READABLE MEDIUM, AND SYSTEM FOR ADJUSTING DATA ACQUISITION PARAMETERS DURING A SCAN PERFORMED BY A POSITRON EMISSION TOMOGRAPHY SCANNER

(71) Applicant: Toshiba Medical Systems Corporation, Otawara-shi (JP)

(72) Inventors: Daniel McGowan, Wauconda, IL (US); Gin Chung Wang, Grayslake, IL (US)

(73) Assignee: Toshiba Medical Systems Corporation, Otawara-shi (JP)

( * ) Notice: Subject to any disclaimer, the term of this patent is extended or adjusted under 35 U.S.C. 154(b) by 132 days.

(21) Appl. No.: 13/913,094

(22) Filed: Jun. 7, 2013

(65) Prior Publication Data
US 2014/0361191 A1 Dec. 11, 2014

(51) Int. Cl.
G01T 1/20 (2006.01)
G01T 1/29 (2006.01)
G01T 1/164 (2006.01)
G01T 1/40 (2006.01)

(52) U.S. Cl.
CPC .......... *G01T 1/2985* (2013.01); *G01T 1/1647* (2013.01); *G01T 1/40* (2013.01)

(58) Field of Classification Search
CPC . G01T 1/1642; G01T 1/1644; G01T 1/1648; G01T 1/247; G01T 1/2985
See application file for complete search history.

(56) References Cited

U.S. PATENT DOCUMENTS

| 2005/0269513 | A1* | 12/2005 | Ianakiev et al. ............. 250/362 |
| 2006/0065848 | A1* | 3/2006 | Ueno et al. .............. 250/370.15 |
| 2008/0116387 | A1* | 5/2008 | Astley et al. ............ 250/370.15 |
| 2008/0290280 | A1* | 11/2008 | Ruetten et al. ........... 250/361 R |
| 2011/0036988 | A1* | 2/2011 | Campbell et al. ........ 250/370.07 |
| 2014/0151562 | A1* | 6/2014 | Wang et al. .................. 250/362 |

FOREIGN PATENT DOCUMENTS

| JP | 2008-514952 | 5/2008 |
| WO | WO 2006/049523 A2 | 5/2006 |

* cited by examiner

*Primary Examiner* — Casey Bryant
(74) *Attorney, Agent, or Firm* — Oblon, McClelland, Maier & Neustadt, L.L.P.

(57) ABSTRACT

An apparatus, method, computer-readable medium, and system for adjusting data acquisition parameters during a scan performed by a Positron Emission Tomography (PET) scanner. The method includes obtaining, during the scan, a current temperature of a detector of the PET scanner, and adjusting, based on the current temperature, the data acquisition parameters used by the PET scanner during the scan.

17 Claims, 4 Drawing Sheets

APPARATUS, METHOD, COMPUTER-READABLE MEDIUM, AND SYSTEM FOR ADJUSTING DATA ACQUISITION PARAMETERS DURING A SCAN PERFORMED BY A POSITRON EMISSION TOMOGRAPHY SCANNER

BACKGROUND

1. Field

Embodiments described herein relate to Positron Emission Tomography (PET) calibration.

2. Background

The calibration coefficients of a Positron Emission Tomography (PET) system are functions of temperature. The calibration coefficients affect the system timing and energy performance. However, in most cases, the calibration coefficients are measured at a specific ambient temperature, and thus the performance of the PET system is not always optimized through the whole temperature range.

BRIEF DESCRIPTION OF THE DRAWINGS

The disclosure will be better understood from reading the description which follows and from examining the accompanying figures. These figures are provided solely as non-limiting examples of the embodiments. In the drawings.

DETAILED DESCRIPTION

Figure 1:
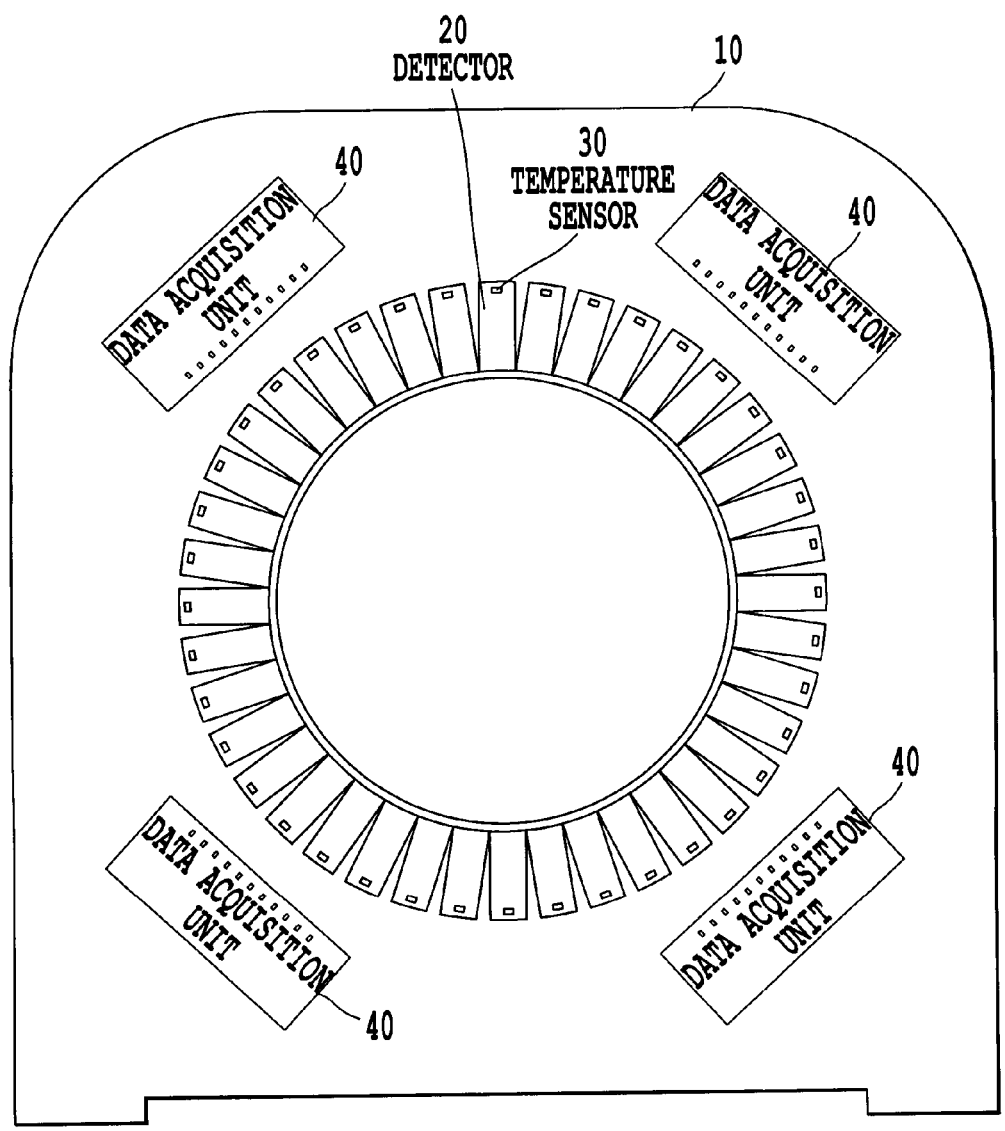
FIG. 1 illustrates a Positron Emission Tomography (PET) system.

The disclosed embodiments discuss an apparatus for adjusting data acquisition parameters during a scan performed by a Positron Emission Tomography (PET) scanner. The apparatus includes a controller configured to obtain, during the scan, a current temperature of a detector of the PET scanner, and adjust, based on the current temperature, the data acquisition parameters used by the PET scanner during the scan.

In one embodiment, the controller is further configured to determine whether the current temperature is different from a previously recorded temperature of the detector, and when the current temperature is different from the previously recorded temperature, adjust the data acquisition parameters used by the PET scanner during the scan. In one embodiment, the controller is further configured to obtain the current temperature at predetermined times during the scan, and adjust the data acquisition parameters at each predetermined time, based on the obtained current temperature.

In one embodiment, the controller is configured to obtain the current temperature from a sensor associated with the detector, and the previously recorded temperature was obtained from the sensor and recorded prior to the scan.

In one embodiment, the apparatus further includes a memory, and the controller is further configured to adjust the data acquisition parameters associated with the current temperature using a predefined table stored in the memory. In one embodiment, the controller is configured to adjust the data acquisition parameters, which include a parameter defining an energy window.

The disclosed embodiments also discuss a method for adjusting data acquisition parameters during a scan performed by a PET scanner. The method includes obtaining, during the scan, a current temperature of a detector of the PET scanner, and adjusting, based on the current temperature, the data acquisition parameters used by the PET scanner during the scan.

In one embodiment, the method further includes determining whether the current temperature is different from a previously recorded temperature of the detector, and when the current temperature is different from the previously recorded temperature, adjusting the data acquisition parameters used by the PET scanner during the scan.

In one embodiment, the obtaining step comprises obtaining the current temperature at predetermined times during the scan, and the adjusting step comprises adjusting the data acquisition parameters at each predetermined time, based on the obtained current temperature.

In one embodiment, the method further includes recording the previously recorded temperature prior to the scan, and the obtaining step comprises obtaining the current temperature from a sensor associated with the detector. In one embodiment, the adjusting step comprises adjusting the data acquisition parameters associated with the current temperature using a predefined table stored in a memory. In one embodiment, the adjusting step comprises adjusting the data acquisition parameters, which include a parameter defining an energy window.

The disclosed embodiments also discuss a non-transitory computer-readable storage medium including computer executable instructions, wherein the instructions, when executed by a computer, cause the computer to perform a method for adjusting data acquisition parameters during a scan performed by a PET scanner. The method includes obtaining, during the scan, a current temperature of a detector of the PET scanner, and adjusting, based on the current temperature, the data acquisition parameters used by the PET scanner during the scan.

In one embodiment, the computer-readable storage medium further includes determining whether the current temperature is different from a previously recorded temperature of the detector, and when the current temperature is different from the previously recorded temperature, adjusting the data acquisition parameters used by the PET scanner during the scan.

In one embodiment, the obtaining step comprises obtaining the current temperature at predetermined times during the scan, and the adjusting step comprises adjusting the data acquisition parameters at each predetermined time, based on the obtained current temperature. In one embodiment, the computer-readable storage medium further includes recording the previously recorded temperature prior to the scan, and the obtaining step comprises obtaining the current temperature from a sensor associated with the detector.

In one embodiment, the adjusting step comprises adjusting the data acquisition parameters associated with the current temperature using a predefined table stored in a memory. In one embodiment, the adjusting step comprises adjusting the data acquisition parameters, which include a parameter defining an energy window.

The disclosed embodiments also discuss a PET scanner for adjusting data acquisition parameters during a scan performed by the PET scanner. The PET scanner includes a plurality of detectors, each detector including a sensor configured to measure temperature, and a controller configured to obtain, during the scan, a current temperature of a detector of the plurality of detectors, and adjust, based on the current temperature, the data acquisition parameters used by the PET scanner during the scan.

In one embodiment, the PET scanner further includes a memory, and the controller is further configured to adjust the data acquisition parameters associated with the current temperature using a predefined table stored in the memory.

The present embodiments relate to improving timing and energy resolution at a wider temperature range, thereby improving PET image quality. In other words, the present embodiments improve performance over the entire temperature range, as opposed to only optimizing for a specific ambient temperature.

In PET, a higher temperature may result in count loss and timing degradation. However, the effect of temperature on photopeak position can be understood and accounted for in data acquisition. Temperature sensors are polled with the acquisition data, and if the temperature varies during the scan, the difference is accounted for.

During system calibration and/or system test in manufacturing, the difference of photopeak position with respect to temperature can be measured at low, nominal, and high ambient temperatures. In other embodiments, measurements can be acquired at any number of temperatures. A calibration table that includes the aforementioned data (e.g., parameter values to be used at various temperatures) is then created. This data is then used to dynamically adjust various parameters used in the PET system. Note that in one embodiment, parameters include a parameter defining an energy window. In one embodiment, the calibration table includes gains for the Photomultiplier Tubes (PMTs), crystal map, crystal-dependent energy coefficients, crystal-dependent timing coefficients, etc. In one embodiment, the calibration table is created during calibration.

Temperature data is acquired while the PET scan is being performed. During the scan, as the temperature changes, the temperature change can be accounted for in real-time during the scan. Interpolation between data points of the calibration table can be used to improve timing and/or energy resolution.

Turning to the figures, FIG. 1 illustrates a PET system 10 that includes a ring of detectors 20. Each of the detectors 20 include a temperature sensor 30 configured to measure the temperature of each detector 20 as well as the other electronics associated with the detectors 20. FIG. 1 also illustrates a plurality of data acquisition units 40 that are configured to acquire the data of a scan.

Figure 2:
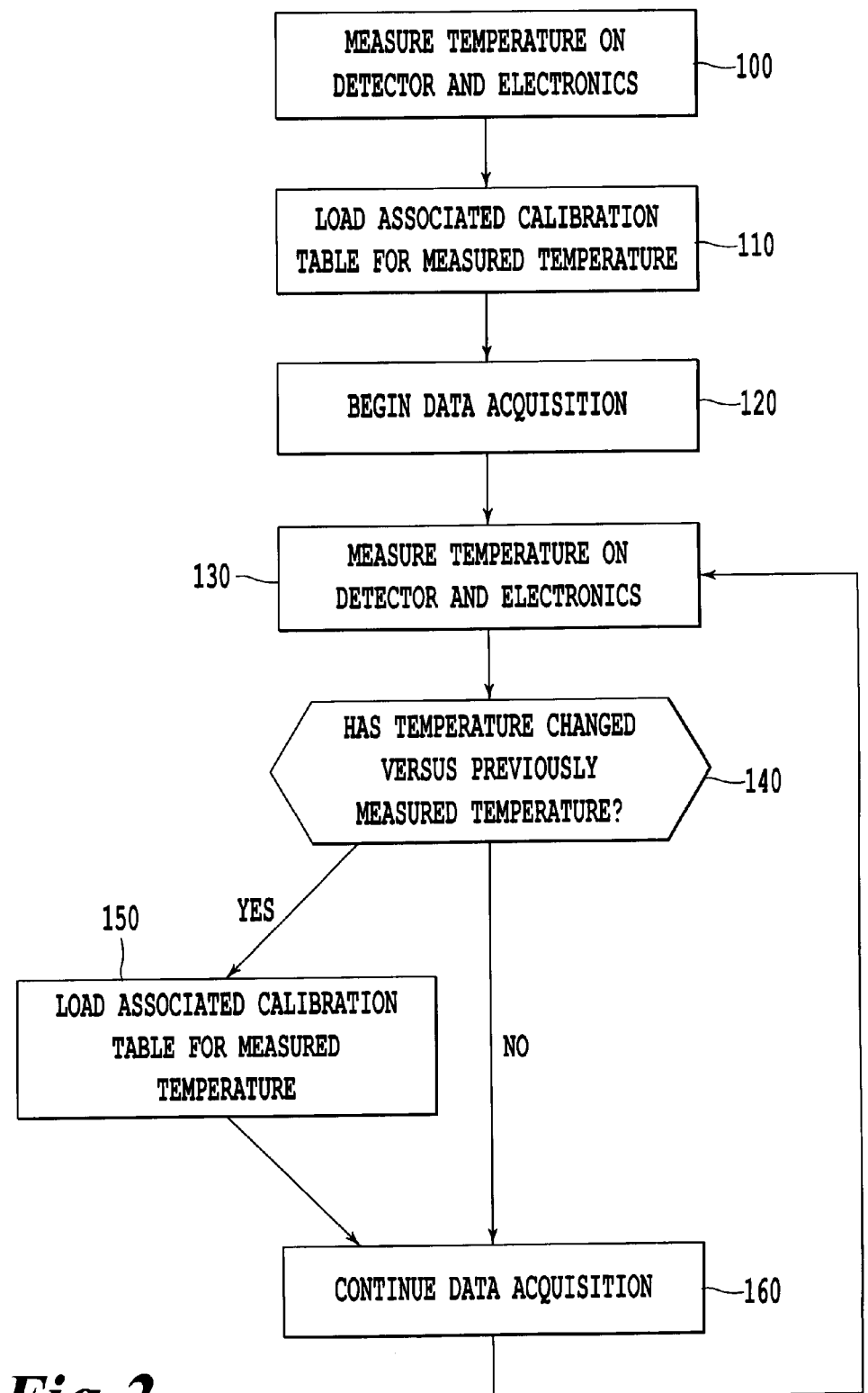
FIG. 2 illustrates a method of the disclosed embodiments.

FIG. 2 illustrates a method of the disclosed embodiments. As can be seen from the process of FIG. 2, temperature is measured both before a scan and during the scan. The process of FIG. 2 starts at step 100 in which the temperature sensors 30 measure the temperature of the detectors 20 and associated electronics. Step 100 may be performed during system calibration and/or system test, and before the acquisition of data (i.e., before an actual scan). Note that, as discussed above, before step 100 is performed, the temperature can be measured at various temperatures, e.g., low, nominal, and high ambient temperatures, and the calibration table may be created.

In step 110, the associated calibration table (created as noted above) for the measured temperatures is loaded. The associated calibration table associates various temperatures or ranges of temperatures, with a particular parameter, value, or calibration coefficient.

In step 120, the acquisition of data (i.e., a scan) by the PET system begins. Note that the acquisition of data in step 120 is performed using the particular parameters, values, or calibration coefficients that are associated with the temperature measured in step 100.

During the data acquisition, the temperature of the detectors and electronics is measured by the temperature sensors 30 in step 130.

Next, in step 140, a comparison is performed to determine whether the temperature has changed from the previously measured temperature. Note that during the first iteration of step 130 and step 140, the previously measured temperature corresponds to the temperature measured in step 100.

If it is determined at step 140 that the temperature has changed (YES), then the process proceeds to step 150 in which the associated calibration table for measured temperature is acquired. The threshold for the change in temperature (i.e., to trigger "YES") is configurable and can vary based on the particular configuration. Next, updated parameters, values, or calibration coefficients associated with the new, changed temperature are now used and the process proceeds to step 160 in which the PET system continues to acquire data using the updated parameters, values, or calibration coefficients. Thus, if the temperature changes during the scan, the change in temperature can be compensated for in real-time as the scan is being performed.

If it is determined at step 140 that the temperature has not changed (NO), then the process proceeds directly to step 160 in which the PET system continues to acquire data. Note that, in this case, there is no need to use different parameters, values, or calibration coefficients since there was no change in temperature.

After step 160, the process loops back to step 130 in which the temperature is again measured. In one embodiment, the measurement of the temperature is performed at particular intervals throughout data acquisition. These intervals are configurable and can vary based on the particular configuration. The process continues until the scan is complete.

In one embodiment, the process may obtain a current temperature at predetermined times during the scan, and adjust the parameter at each predetermined time, based on the obtained current temperature. In other words, in this embodiment, a determination whether a current temperature is different from a previously recorded temperature (see, for example, step 140 of FIG. 2) need not be performed. Instead, the process continuously obtains temperatures of the detector at predetermined times throughout the scan and adjusts the parameter at each predetermined time, based on the obtained temperature. This process is performed until the scan is complete.

Figure 3:
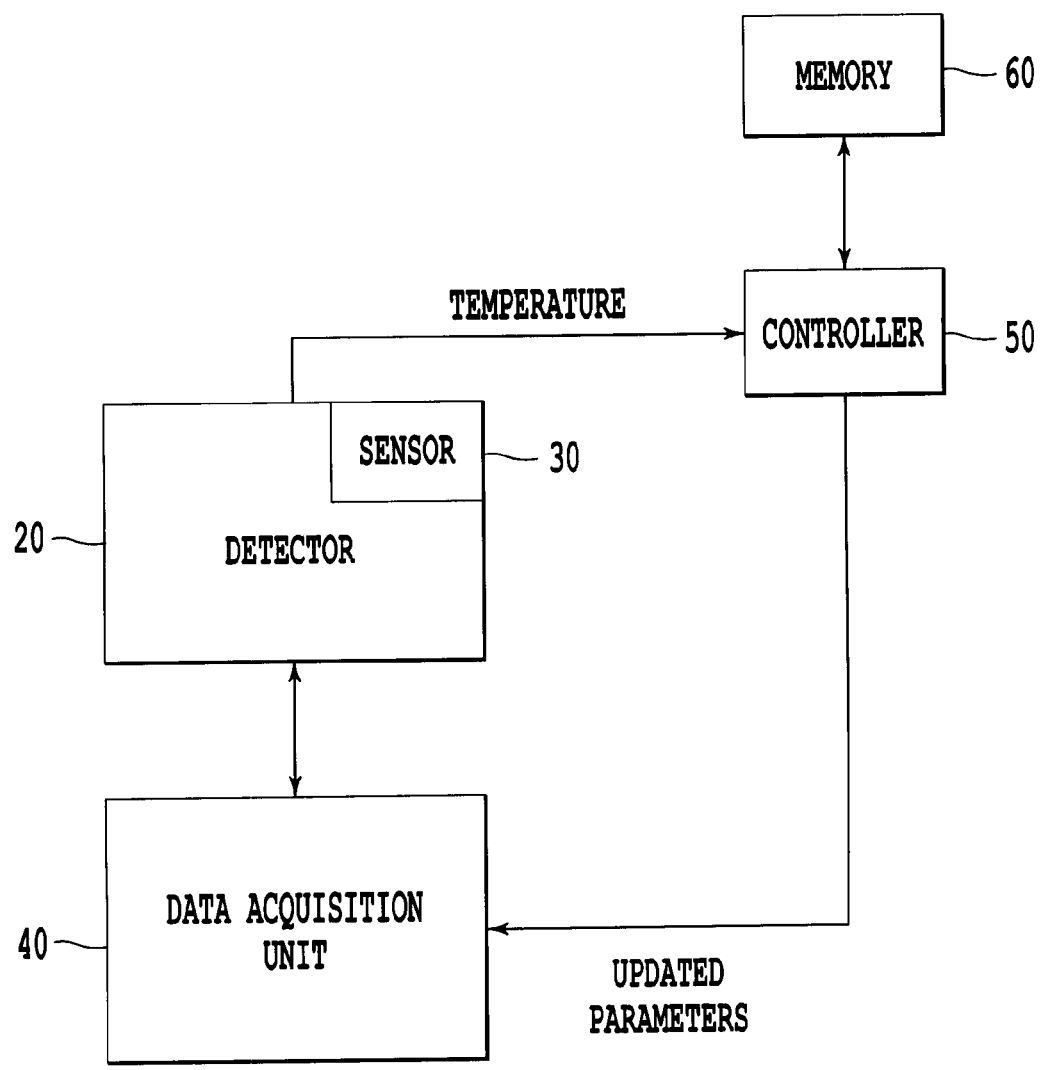
FIG. 3 illustrates a system for temperature compensation according to the disclosed embodiments.

FIG. 3 illustrates a system for temperature compensation according to the disclosed embodiments. Detector 20 includes, for example, temperature sensor 30 (also shown in FIG. 1). In one embodiment, elements 20, 30, 40, 50, and 60 are part of a PET scanner system, such as system 10 of FIG. 1. In one embodiment, controller 50 is part of the data acquisition unit 40.

As can be seen from FIG. 3, controller 50, which can be implemented as a processor executing a computer program or as a special-purpose circuit, obtains temperature measurements from sensor 30 included in detector 20. Controller 50 then searches for the data acquisition parameters in the memory 60 that correspond to the acquired temperature, and sends the updated data acquisition parameters to data acquisition unit 40. The scan is continued using the updated parameters. When the scan is complete, data acquisition unit

40 sends the acquired data to a reconstruction processor (not shown), which performs image reconstruction based on the acquired PET event data.

Note that although the above-disclosed embodiments are discussed with respect to one detector, these embodiments may be applied to a plurality of detectors (or all of the detectors in PET system 10 of FIG. 1), such that temperatures are measured for the plurality of detectors, and data acquisition parameters for each detector are updated. In one embodiment, with regard to FIG. 3, controller 50 obtains temperatures from a sensor included in each of the plurality of detectors 20. Thus, in one embodiment, parameters are adjusted for individual detectors.

As noted above, the present embodiments improve performance over the entire temperature range, as opposed to only optimizing for a specific ambient temperature. Thus, e.g., the energy window location is temperature dependent, which means that more counts will be acquired. Further, the overall scan time may decrease as more counts are acquired.

A secondary advantage of the disclosed embodiments is better rejection of scatter, which is also energy-window-location dependent. More accurate energy window placement (for example, 425 keV to 650 keV) improves the timing walk correction, thus improving timing resolution.

Each of the functions described above may be implemented by one or more processing circuits. Furthermore, the data acquisition units 40 may also be implemented by one or more processing circuits. A processing circuit includes a programmed processor (for example, processor 1203), as a processor includes circuitry. A processing circuit also includes devices such as an application specific integrated circuit (ASIC) and conventional circuit components arranged to perform the recited functions.

Figure 4:
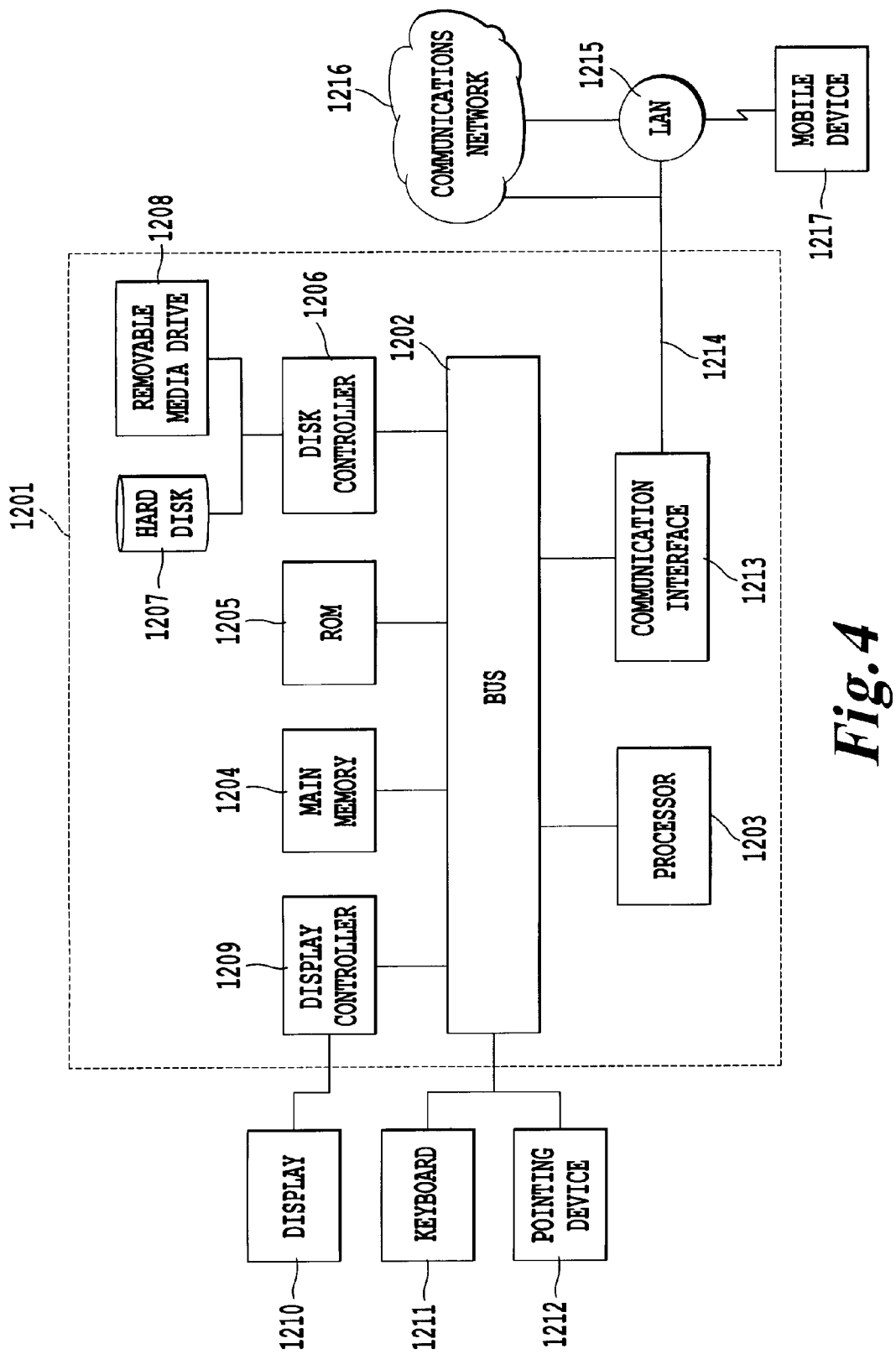
FIG. 4 illustrates a computer system upon which disclosed embodiments may be implemented.

Further, the process discussed in the disclosed embodiments can be performed by PET system 10 or a computer system (or programmable logic). FIG. 4 illustrates a computer system 1201 upon which disclosed embodiments may be implemented. The computer system 1201 may perform the above-described processes (for example, the processes discussed with respect to FIG. 2) and communicate with PET system 10. In an embodiment, various components of the system of FIG. 4 may be included in the PET system 10 of FIG. 1. In an embodiment, computer system 1201 of FIG. 4 may correspond to element 50 of FIG. 3, or a plurality of elements of FIG. 3.

The computer system 1201 includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, for displaying information to a computer user. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210.

The processor 1203 executes one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1201, for driving a device or devices for implementing the invention, and for enabling the computer system 1201 to interact with a human user. Such software may include, but is not limited to, device drivers, operating systems, and applications software. Such computer readable media further includes the computer program product of the present disclosure for performing all or a portion (if processing is distributed) of the processing performed in implementing the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media, on the contrary, includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an integrated services digital network (ISDN) card. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An apparatus for adjusting data acquisition parameters during Positron Emission Tomography (PET) event data acquisition, comprising:
   a PET scanner configured to perform the PET event data acquisition; and
   a controller configured to
      obtain, during the PET event data acquisition, a current temperature of a detector of the PET scanner,
      adjust, based on the current temperature, location of an energy window used by the PET scanner during the PET event data acquisition,
      acquire PET event data using the energy window adjusted based on the current temperature, and
      generate a PET image based on the PET event data acquired.

2. The apparatus according to claim 1, wherein the controller is further configured to
   determine whether the current temperature is different from a previously recorded temperature of the detector, and
   when the current temperature is different from the previously recorded temperature, adjust the location of the energy window used by the PET scanner during the PET event data acquisition.

3. The apparatus according to claim 1, wherein the controller is further configured to
   obtain the current temperature at predetermined times during the PET event data acquisition, and
   adjust the location of the energy window at each predetermined time during the PET event data acquisition, based on the obtained current temperature.

4. The apparatus according to claim 2, wherein
   the controller is configured to obtain the current temperature from a sensor associated with the detector, and
   the previously recorded temperature was obtained from the sensor and recorded prior to the PET event data acquisition.

5. The apparatus according to claim 1, further comprising:
   a memory, wherein
   the controller is further configured to adjust the location of the energy window associated with the current temperature using a predefined table stored in the memory.

6. A method for adjusting data acquisition parameters during Positron Emission Tomography (PET) event performed by a PET scanner, comprising:
   obtaining, during the PET event data acquisition, a current temperature of a detector of the PET scanner;
   adjusting, based on the current temperature, location of an energy window used by the PET scanner during the PET event data acquisition;
   acquiring PET event data using the energy window adjusted based on the current temperature; and
   generating a PET image based on the PET event data acquired.

7. The method according to claim 6, further comprising:
   determining whether the current temperature is different from a previously recorded temperature of the detector; and
   when the current temperature is different from the previously recorded temperature, adjusting the location of the energy window used by the PET scanner during the PET event data acquisition.

8. The method according to claim 6, wherein
the obtaining step comprises obtaining the current temperature at predetermined times during the PET event data acquisition, and
the adjusting step comprises adjusting the location of the energy window at each predetermined time, based on the obtained current temperature.

9. The method according to claim 7, further comprising:
recording the previously recorded temperature prior to the PET event data acquisition, wherein
the obtaining step comprises obtaining the current temperature from a sensor associated with the detector.

10. The method according to claim 6, wherein the adjusting step comprises adjusting the location of the energy window associated with the current temperature using a predefined table stored in a memory.

11. A non-transitory computer-readable storage medium including computer executable instructions, wherein the instructions, when executed by a computer, cause the computer to perform a method for adjusting data acquisition parameters during Positron Emission Tomography (PET) event data acquisition performed by a PET scanner, the method comprising:
obtaining, during the PET event data acquisition, a current temperature of a detector of the PET scanner;
adjusting, based on the current temperature, location of an energy window used by the PET scanner during the PET event data acquisition;
acquiring PET event data using the energy window adjusted based on the current temperature; and
generating a PET image based on the PET event data acquired.

12. The non-transitory computer-readable storage medium according to claim 11, further comprising:
determining whether the current temperature is different from a previously recorded temperature of the detector; and
when the current temperature is different from the previously recorded temperature, adjusting the location of the energy window used by the PET scanner during the PET event data acquisition.

13. The non-transitory computer-readable storage medium according to claim 11, wherein
the obtaining step comprises obtaining the current temperature at predetermined times during the PET event data acquisition, and
the adjusting step comprises adjusting the location of the energy window at each predetermined time, based on the obtained current temperature.

14. The non-transitory computer-readable storage medium according to claim 12, further comprising:
recording the previously recorded temperature prior to the PET event data acquisition, wherein
the obtaining step comprises obtaining the current temperature from a sensor associated with the detector.

15. The non-transitory computer-readable storage medium according to claim 11, wherein the adjusting step comprises adjusting the location of the energy window associated with the current temperature using a predefined table stored in a memory.

16. A Positron Emission Tomography (PET) scanner for adjusting data acquisition parameters during PET event data acquisition performed by the PET scanner, comprising:
a plurality of detectors, each detector including a sensor configured to measure temperature; and
a controller configured to
obtain, during the PET event data acquisition, a current temperature of a detector of the plurality of detectors,
adjust, based on the current temperature, location of an enemy window used by the PET scanner during the PET event data acquisition,
acquire PET event data using the energy window adjusted based on the current temperature, and
generate a PET image based on the PET event data acquired.

17. The PET scanner according to claim 16, further comprising:
a memory, wherein
the controller is further configured to adjust the location of the energy window associated with the current temperature using a predefined table stored in the memory.

* * * * *